(12) United States Patent
Canals Pou et al.

(10) Patent No.: US 12,502,839 B2
(45) Date of Patent: Dec. 23, 2025

(54) PRINT AGENT COVERAGE AMOUNTS

(71) Applicant: Peridot Print LLC, Palo Alto, CA (US)

(72) Inventors: Alberto Maria Canals Pou, Sant Cugat del Valles (ES); Marc Casalprim Torres, Sant Cugat del Valles (ES); Xavier Alonso Becerro, Sant Cugat del Valles (ES)

(73) Assignee: PERIDOT PRINT LLC, Palo Alto, CA (US)

( * ) Notice: Subject to any disclaimer, the term of this patent is extended or adjusted under 35 U.S.C. 154(b) by 148 days.

(21) Appl. No.: 18/559,475

(22) PCT Filed: May 12, 2021

(86) PCT No.: PCT/US2021/031880
§ 371 (c)(1),
(2) Date: Nov. 7, 2023

(87) PCT Pub. No.: WO2022/240397
PCT Pub. Date: Nov. 17, 2022

(65) Prior Publication Data
US 2024/0227308 A1 Jul. 11, 2024

(51) Int. Cl.
*B29C 64/165* (2017.01)
*B29C 64/393* (2017.01)
*B33Y 10/00* (2015.01)
*B33Y 50/02* (2015.01)

(52) U.S. Cl.
CPC ............ *B29C 64/393* (2017.08); *B33Y 10/00* (2014.12); *B33Y 50/02* (2014.12)

(58) Field of Classification Search
None
See application file for complete search history.

(56) References Cited

U.S. PATENT DOCUMENTS

| | | | |
|---|---|---|---|
| 8,568,649 B1 * | 10/2013 | Balistreri | B33Y 80/00 264/642 |
| 10,625,469 B2 | 4/2020 | De Pena et al. | |
| 2017/0113414 A1 | 4/2017 | Zeng et al. | |
| 2018/0001568 A1 * | 1/2018 | Sanchez Ribes | B33Y 30/00 |
| 2019/0111626 A1 * | 4/2019 | Hierro Domenech | B29C 64/386 |
| 2020/0215760 A1 * | 7/2020 | Wijn | B29C 64/268 |
| 2024/0033828 A1 * | 2/2024 | Ouchi | B22F 12/82 |

FOREIGN PATENT DOCUMENTS

| | | | | |
|---|---|---|---|---|
| CN | 107206688 A | 9/2017 | | |
| RU | 2674511 C1 | 12/2018 | | |
| WO | WO-2019013745 A1 * | 1/2019 | ............ | B33Y 70/00 |
| WO | WO-2019013746 A1 * | 1/2019 | ............ | B33Y 50/00 |
| WO | 2020/153953 A1 | 7/2020 | | |

* cited by examiner

Primary Examiner — Yung-Sheng M Tsui
(74) Attorney, Agent, or Firm — Michael Dryja

(57) ABSTRACT

In an example, a method includes generating a plurality of calibration objects, each in a different region of a fabrication chamber of an additive manufacturing apparatus. In some examples the method further includes obtaining a measurement of a physical property of each calibration object. The method may include determining, by processing circuitry, calibrated print agent coverage amounts for each region based on the measured physical properties of the calibration objects wherein the calibrated print agent coverage amounts are to be used in a subsequent object generation operation.

19 Claims, 9 Drawing Sheets

PRINT AGENT COVERAGE AMOUNTS

BACKGROUND

Additive manufacturing techniques may generate a three-dimensional object through the solidification of a build material, for example on a layer-by-layer basis. In examples of such techniques, build material may be supplied in a layer-wise manner and the solidification method may include heating the layers of build material to cause melting in selected regions. In other techniques, chemical solidification and/or binding methods may be used.

BRIEF DESCRIPTION OF DRAWINGS

Non-limiting examples will now be described with reference to the accompanying drawings, in which.

DETAILED DESCRIPTION

Figure 1:
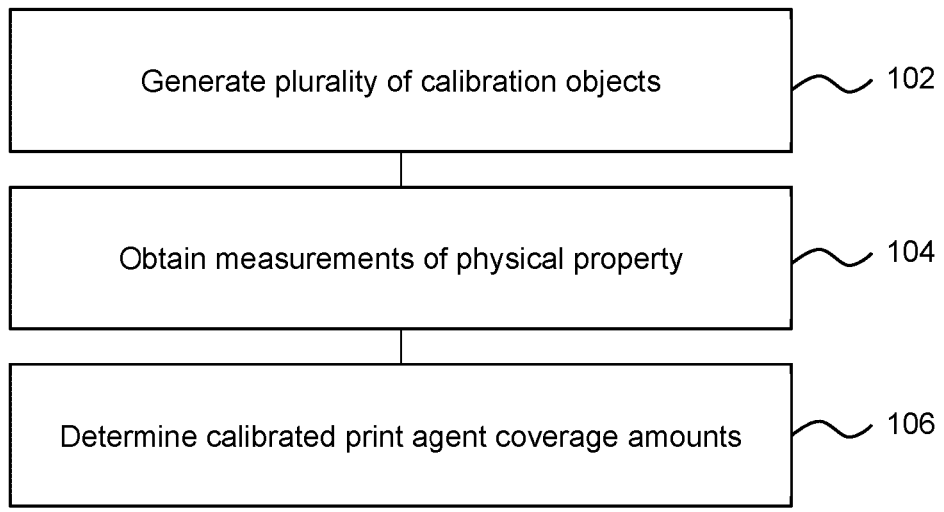
FIG. 1 is an example method of determining print agent coverage amounts for use in additive manufacturing.

Additive manufacturing techniques may generate a three-dimensional object through the solidification of a build material. In some examples, the build material is a powder-like granular material, which may for example be a plastic, ceramic or metal powder and the properties of generated objects may depend on the type of build material and the type of solidification mechanism used. Build material may be deposited, for example on a print bed and processed layer by layer, for example within a fabrication chamber. According to one example, a suitable build material may be PA12 build material commercially referred to as V1R10A "HP PA12" available from HP Inc. Other example build materials comprise PA11 material, commercially referred to as V1R12A "HP PA12", Thermoplastic Polyurethane (TPU) materials, Thermoplastic Polyamide materials (TPA), and the like.

In some examples, selective solidification is achieved through directional application of energy, for example using a laser or electron beam which results in solidification of build material where the directional energy is applied. In other examples, at least one print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of a three-dimensional object to be generated (which may for example be determined from structural design data). The data may be derived from a digital or data model of the object, e.g. object model data provides a data, or virtual, model of an object to be generated. The fusing agent may have a composition which absorbs energy such that, when energy (for example, heat) is applied to the layer, the build material to which it has been applied heats up, coalesces and solidifies, upon cooling, to form a slice of the three-dimensional object in accordance with the pattern. In other examples, coalescence may be achieved in some other manner.

According to one example, a suitable fusing agent may be an ink-type formulation comprising carbon black, such as, for example, the fusing agent formulation commercially referred to as V1Q60A "HP fusing agent" available from HP Inc. Such a fusing agent may comprise any or any combination of an infra-red light absorber, a near infra-red light absorber, a visible light absorber and a UV light absorber. Examples of fusing agents comprising visible light absorption enhancers are dye based colored ink and pigment based colored ink, such as inks commercially referred to as CE039A and CE042A available from HP Inc.

In addition to a fusing agent, in some examples, a print agent may comprise a coalescence modifier agent, which acts to modify the effects of a fusing agent for example by reducing or increasing coalescence or to assist in producing a particular finish or appearance to an object, and such agents may therefore be termed detailing agents. In some examples, detailing agent may be used near edge surfaces of an object being printed to reduce coalescence. According to one example, a suitable detailing agent may be a formulation commercially referred to as V1Q61A "HP detailing agent" available from HP Inc. A coloring agent, for example comprising a dye or colorant, may in some examples be used as a fusing agent or a coalescence modifier agent, and/or as a print agent to provide a particular color for the object.

As noted above, additive manufacturing systems may generate objects based on structural design data. This may involve a designer determining a data model of an object to be generated, for example using a computer aided design (CAD) application. The model may define the solid portions of the object. To generate a three-dimensional object from the model using an additive manufacturing system, the model data can be processed to define slices or parallel planes of the model. Each slice may define a portion of a respective layer of build material that is to be solidified or caused to coalesce by the additive manufacturing system.

A position within the fabrication chamber may be defined by coordinates, for example, in a scheme used herein, a horizontal position may be defined using x and y coordinates and the vertical position may be defined by a z coordinate. The x and y directions may be parallel to the walls of the fabrication chamber and the z direction may be perpendicular to the layers of deposited build material.

FIG. 1 is an example of a method, which may comprise a method for determining print agent coverage amounts. In this example the method is carried out at least in part by processing circuitry, which may comprise at least one processor.

The method comprises, in block 102, generating a plurality of calibration objects, each in a different region of a fabrication chamber of an additive manufacturing apparatus.

In order to generate an object, print agent may be selectively deposited onto portions of build material. For example, a fusing agent may be deposited in areas which are intended to be solidified to generate the object and a detailing agent may be deposited in regions surrounding the regions intended to be solidified in order to prevent 'over fusing' or fusing in areas around the object.

Generating an object in additive manufacturing may comprise obtaining data describing which portions of build material print agent is to be deposited upon, for example based on object model data representing the object to be generated. Print agent coverage amounts referred to herein may be the print agent coverage amounts to be deposited in these portions, for example a fusing agent coverage amount may refer to the fusing agent coverage amount which is to be deposited in a region intended to be solidified and a detailing agent coverage amount may refer to the detailing agent coverage amount which is to be deposited in a region which is not intended to be solidified. In some examples, detailing agent is deposited in proximity to regions in which fusing agent is applied, for example about the periphery of a layer of the object being formed, rather than all regions of a layer of build material which are not intended to be solidified. In some examples, detailing agent may be dispensed onto a region of build material which is intended to be solidified. The print agent coverage amounts may for example be defined as an area coverage, that is the volume of printing agent to be deposited per unit area, or as a percentage coverage, that is, the percentage of an area which is intended to be covered with the print agent. In some examples, it may be defined as a contone level. The locations to which print agent drops are applied and/or the amount and/or size of such drops may be determined according to an intended coverage, for example using halftoning techniques and the like.

In particular, in this example, calibration objects may be generated by an additive manufacturing apparatus based on object model data which defines the size and shape of the calibration objects. In some examples, the calibration objects may be representative of a particular application, for example if the additive manufacturing apparatus is intended to be subsequently used to generate a particular type of object, the calibration objects may have similar features to that type of object. In some examples, all the calibration objects may be generated based on the same underlying object model data (or based on object model data which differs in a minor regard, such as an identifier). The calibration object may be designed to have particular properties to test certain aspects of object generation. For example, it may have an intended weight or dimensions. In some examples the calibration objects may have certain features, such as relatively small protrusions or openings, which can be used to test the successful operation of the additive manufacturing apparatus. In some examples, the calibration objects are generated in a single plane i.e. at the same depth within the fabrication chamber and have different x and y coordinates. In some examples, variations in conditions in the fabrication chamber are greater in the x and y directions compared with the z direction. Therefore, generating a set of calibration objects at different x and y coordinates and the same z coordinates may be sufficient to characterise the fabrication chamber and to determine print agent coverages to reduce variability of the generated objects. Therefore, the print agent coverage amounts for each x and y position determined by this method may be used for each z position within a fabrication chamber i.e. for particular x and y coordinates, the same print agent coverage amount may be used for different z coordinates. In other examples, calibration objects may be generated at a plurality of depths within the fabrication chamber to additionally characterise variations in the z direction. In such examples different print agent coverages may also be determined for different z positions.

In some examples, object model data may represent calibration object(s) having length and width dimensions which are greater than the height, in the orientation in which the objects are intended to be generated. In other words, the objects may have a relatively flat tablet like form. This means that the objects can be generated in relatively few layers, thus decreasing the time taken to generate the set of calibration objects.

In addition, in some examples, the object model data describes an object having a lattice body. In other words, the object body is intended to comprise struts formed around a plurality of voids. This serves to reduce the amount of build material which forms part of the calibration object (noting that, in some examples, unfused build material may be recycled in subsequent additive manufacturing operations) while still sampling the fusing behaviour over a relatively large area of the print bed. In addition, the object properties of such an object may be relatively variable depending on the extent of fusion. For example, higher temperatures may cause 'over fusing' and the voids may at least partially close up. However, if the temperature is too low, at least some of the struts may fail to form as intended.

In addition, such lattices can provide useful properties for subsequent objects which may be generated. For example, lattices can provide tailored strength, weight, and resilience properties, which may be useful in generated objects. In such examples, the method of FIG. 1 may be useful in calibrating an object generation apparatus to generate a particular lattice arrangement, and the lattice of the calibration object may be a sample of a lattice to be included in a subsequently generated object.

In this example, the set of calibration objects generated are regularly distributed over the surface of the print bed. For example, the surface may be conceptually divided into a number of regions, and an object is generated in at least some of the regions. The calibration objects are generated over a plurality of common layers, such that they are formed at the same height in the additive manufacturing chamber.

The method comprises, in block 104, obtaining a measurement of a physical property of each calibration object.

For example, once generated, the calibration objects are removed from the additive manufacturing apparatus (for example, being 'decaked' from surrounding unfused build material, and in some examples being cleaned) and a physical property of each calibration object is measured, for example by weighing each calibration object. In some examples the measurement may be of a different physical property, for example it may be a measurement of a dimension, flexibility or strength (tensile or compressive) of the object. In some examples, the location of generation may be associated with objects as they are measured. As noted above, in some examples, the calibration objects may be generated so as to have an identifier in order to facilitate this. In some examples, the identifier may be selected such that it does not cause a significant change to the physical properties, such as weight, of one object compared to another. As used herein, the location of an object within the fabrication chamber may refer to a point, for example the location of an object may be a centre of mass of the object or some other reference location associated with the object, such as the lowest [x, y] coordinates, or the like. In other examples, the fabrication chamber may be split into predefined regions, and each region may be associated with a calibration object generated within that zone. For example, each region may be identified with an identifier, such as an alphanumeric identifier and the calibration object generated within each zone may be identified with the same alphanumeric identifier.

In some examples, the physical property measured in block 104 is an indication of the extent of fusion of build material. As noted above, this may be provided by a measured weight of generated calibration object(s). The calibration object(s) may have predetermined expected dimensions, and more generally a predetermined form and solid volume, and therefore the weight may provide a proxy for determining the amount of build material which has been incorporated into the object. Generally, in examples herein, a higher extent of fusion is associated with a greater weight. In some examples, the indication may for example comprise another physical property or attribute, for example a strength or flexibility of the object(s) (a higher extent of fusion may be associated with a higher resistance to breaking in a strength test, and/or a lower amount of flexibility) and/or a density of the object (which may in some examples be inferred from the weight).

In some examples, the measured property may be the dimensions of an object (or a portion of an object), which may also provide an indication of the extent of fusion of build material. In some cases, an object which is subjected to a high extent of fusing may 'grow' as build material which is at least partially fused may be incorporated therein, or unfused build material may adhere to the surfaces thereof. However, in other examples, a high extent of fusion may be associated with a higher degree of shrinkage on cooling and thus a reduction in dimensions may be associated with a high extent of fusion. This can depend on factors such as, for example, the materials used.

The extent of fusion may provide an indication of the temperature of an object, or a portion of an object, during generation of the object. As described above, an increased extent of fusing may indicate a higher temperature, and a lower extent of fusing may indicate a lower temperature.

The method comprises, in block 106, determining calibrated print agent coverage amounts for each region based on the measured physical property of the calibration objects wherein the calibrated print agent coverage amounts are to be used to determine print agent amounts to be applied in a subsequent object generation operation. In some examples the calibrated print agent coverage amounts may be determined by associating each measured property with a location (or region) of generation of the measured object. In some examples, the determined calibrated print agent coverage amounts may be used directly in a subsequent build operation whereas in other examples they may comprise initial amounts, which may be modified as part of data processing in the subsequent object generation operation. For example, the calibrated print agent coverage amounts may be modified based on anticipated or observed local thermal properties during object generation, which may vary, for example based on the volume of an object, or the proximity of other objects being generated. In some examples, there may be a plurality of different calibrated print agent coverage amounts determined for each region, and/or the calibrated print agent coverage amounts may be different for different regions.

The extent of fusing can be affected by the amount of print agents which are deposited on a region of build material during object generation. For example, increasing the coverage amount of detailing agent can reduce the temperature and/or reduce the propagation of heat in the build material during fusing, thereby reducing the extent of fusion. Conversely a lower coverage amount of detailing agent can increase the temperature during fusion. The extent of fusing may also be affected by the coverage amount of fusing agent which is deposited on a region of build material during fusing. An increased amount of fusing agent can increase the temperature during fusing thereby increasing the extent of fusion and conversely a lower amount of fusing agent can reduce the amount of fusing.

Due to inhomogeneities within the fabrication chamber of an additive manufacturing apparatus, objects generated in different regions of the fabrication chamber may have different properties. For example, the temperature of build material may vary throughout the fabrication chamber and may be lower near the edges. Therefore, the extent of fusion of the build material may vary throughout the fabrication chamber, for example it may be lower near the edges due to the lower temperature.

In some examples, the properties of the generated objects may be modified by varying the coverage amount of print agent which is deposited in a region of build material. For example, in the absence of specific action taken, an edge of a fabrication chamber may tend to be at a lower temperature relative to the centre of the fabrication chamber. This could potentially lead to a greater extent of fusion of the build material in an object generated near the centre of the fabrication chamber resulting in different physical properties of the objects. For example, the object generated at the centre may have greater strength, lower flexibility and/or greater weight than an object generated near the edge. By modifying the print agent coverage amounts used to generate the objects it may be possible to counter this potential source of variability and thereby reduce the differences in physical properties of the objects. For example, the amount of fusing agent may be decreased, or the amount of detailing agent may be increased when generating the object near the centre (thus reducing the temperatures in some examples) and/or the amount of fusing agent may be increased, or the amount of detailing agent may be decreased (thus increasing the temperature in some examples) when generating the object near the edge, relative to the amounts used at a centre.

By generating a plurality of calibration objects and obtaining measurements of their physical properties, the inhomogeneities of the fabrication chamber can be characterised which allow the coverage amount of print agents to be modified to account for these inhomogeneities, thereby reducing variability in the physical properties of objects generated in different regions of the fabrication chamber.

Figure 2A:
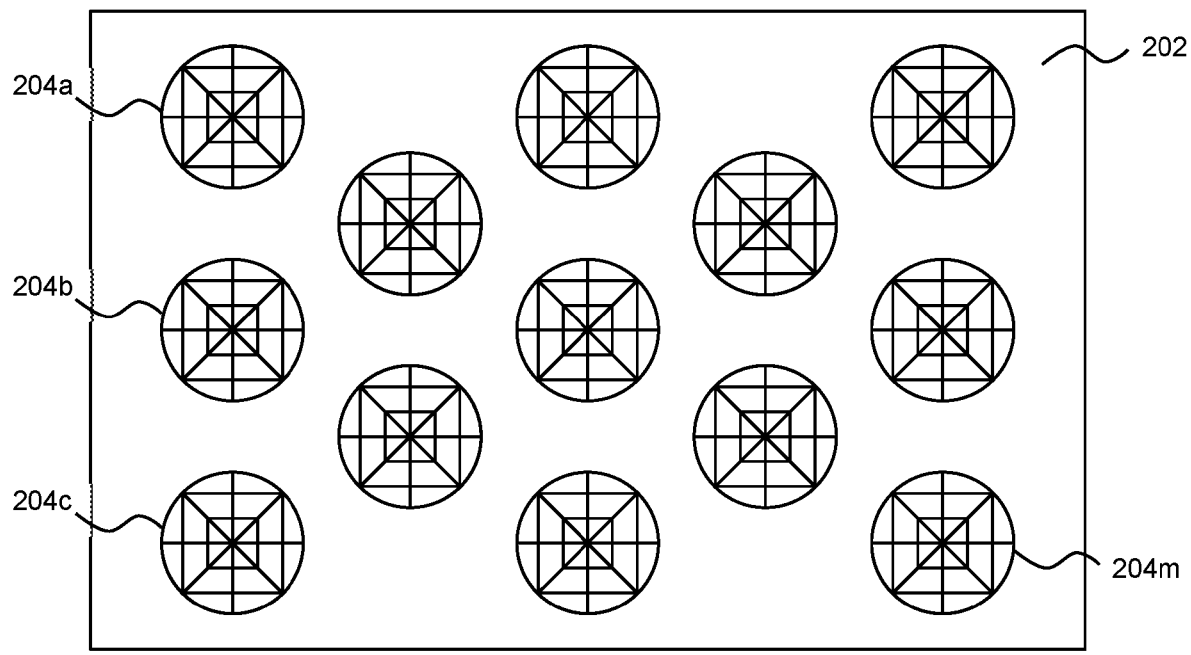
FIGS. 2A, 2B and 2C show example arrangements of objects on a print bed.

FIG. 2A shows an example of a print bed 202 of a fabrication chamber of an additive manufacturing apparatus having printed thereon a set of calibration objects 204*a-m* (not all of which are labelled to avoid overcomplicating the Figure). In this example, all of the calibration objects 204*a-m* being generated are nominally the same and are generated using the same object model data (wherein the object model data provides a data, or virtual, model of an object to be generated). However, in some examples, the object model data for each calibration object may be at least slightly different, for example to comprise identifying information, such as a unique number or other identifier. The object model data in this case represents a lattice tablet, with a diameter measuring around 81 mm and around 40 mm in height. The calibration objects are generated based on this object model data so as to be separated from other such objects by a distance of around 20 mm. When the calibration objects 204*a-m* are generated, a physical property of each may be measured, for example their weight, strength, flexibility and/or a dimension. The measured physical property may be associated with a region of the print bed 202 and used to modify the coverage amount of a print agent used when generating subsequent objects in that region.

In some examples, calibration objects 204a-m may be generated several times using a different quantity of a print agent to characterise how the physical property varies with coverage amount of print agent. In some examples, each time the calibration objects 204a-m are generated using a different quantity of print agent, they may be generated with different identifiers to distinguish objects generated with different quantities of print agents. For example, the calibration objects 204a-m may be generated using a baseline coverage amount of print agent, for example a contone level of 2, then a second batch of objects 204a-m may be generated using an increased amount of print agent, for example a contone level of 11, and then a third batch of calibration objects 204a-m may be generated using an even greater amount of print agent, for example a contone level of 20. The physical properties may be measured and compared.

Figure 2B:
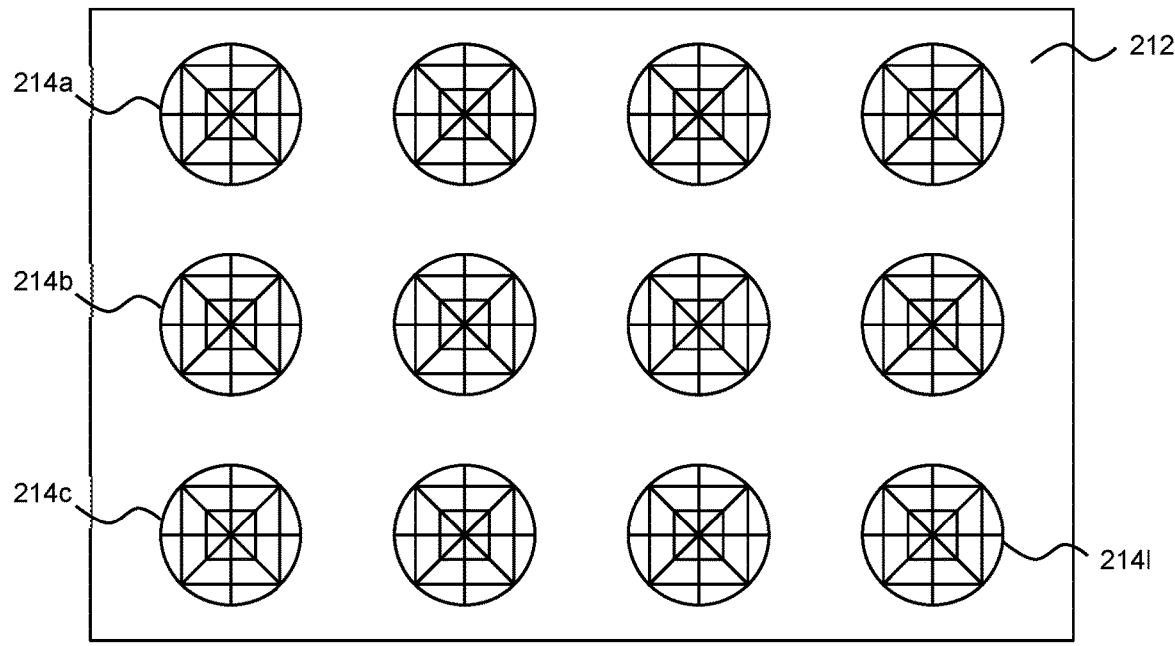
Figure 2C:
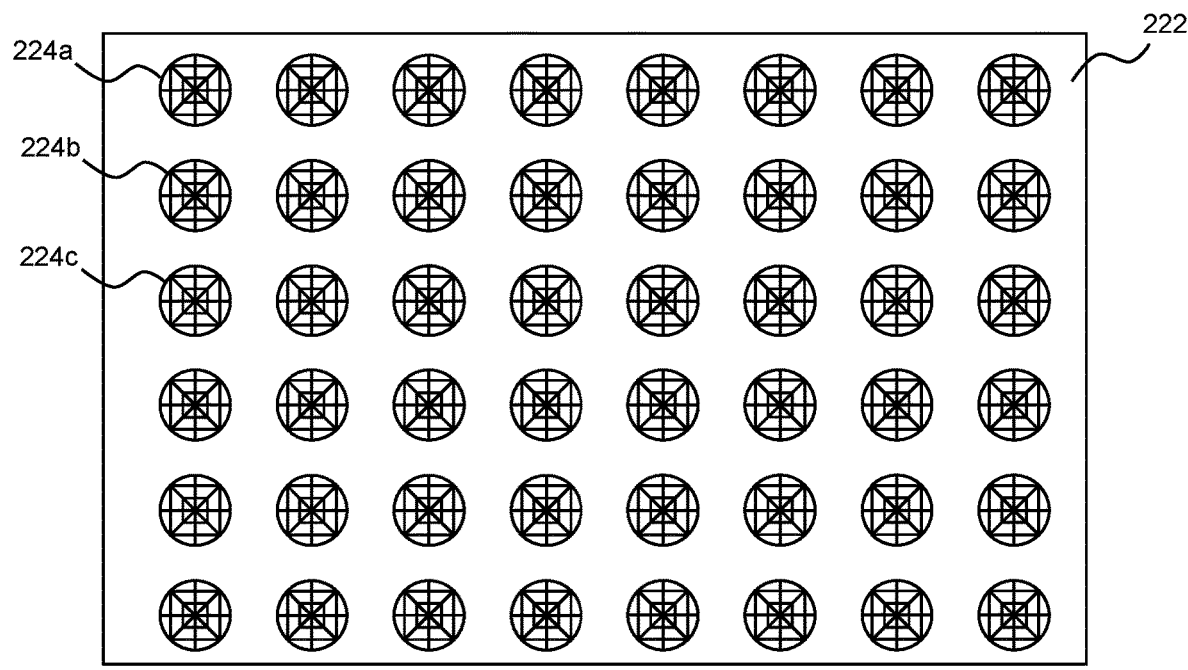

FIG. 2B shows another example of a print bed 212 of a fabrication chamber of an additive manufacturing apparatus having a different set of calibration objects 214a-l printed thereon (not all of which are labelled to avoid overcomplicating the Figure). In this example the calibration objects are arranged in a regular grid. FIG. 2C is a further example of a print bed 222 of a fabrication chamber having a different set of calibration objects 224 printed thereon. In this example the calibration objects are smaller and there is a larger number of calibration objects. By using a larger number of calibration objects the local conditions can be sampled more precisely and therefore the physical properties of an object as a function of its position within the fabrication chamber can be more accurately determined. However, generating more objects may be slower and require more measurements to be taken.

Figure 3:
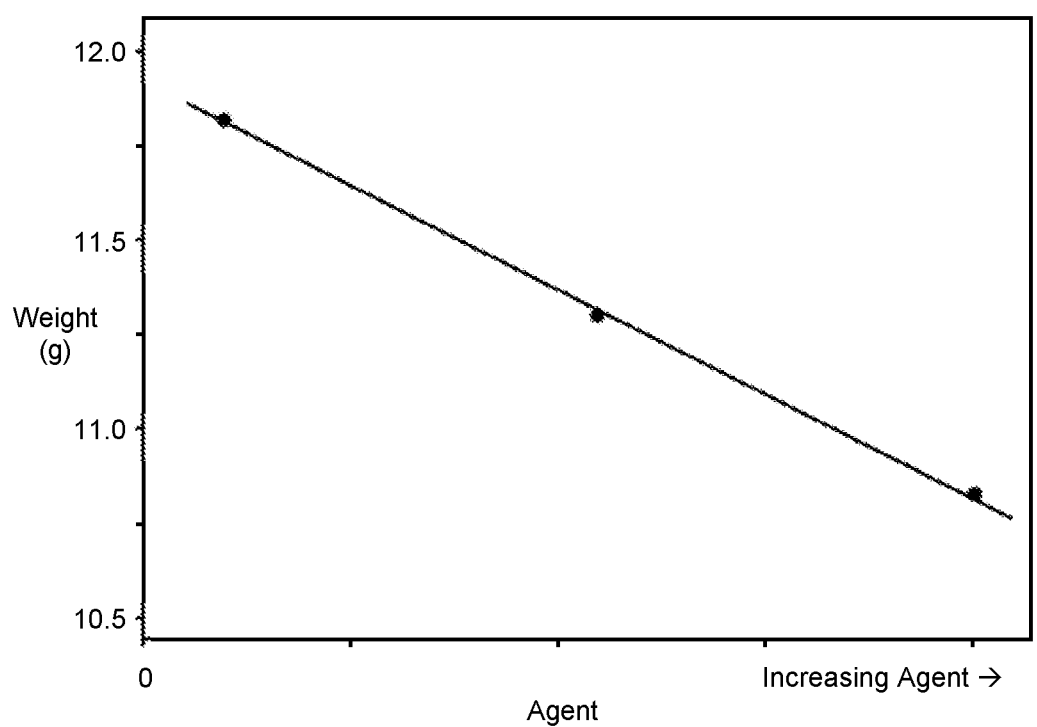
FIG. 3 is a graph showing the relationship between agent coverage and weight.

FIG. 3 is a graph which shows how a physical property varies with a coverage amount of agent, in particular it shows how the weight of a calibration object varies with the coverage amount of detailing agent used when generating the calibration object. When an object is being generated in additive manufacturing, detailing agent may be used around the boundary of each region which is intended to be solidified, or may be applied over any build material which is not intended to solidify. In some examples, detailing agent may also be used in other regions, for example in regions which are intended to be internal to the generated object to control the temperature during object generation. In this example, varying the detailing agent coverage amount refers to varying the coverage amount of detailing agent for either or both purposes. In order to determine this data, a set of calibration objects as described in relation to FIG. 2A was generated three times, each time using a different coverage amount of detailing agent. The points shown in the graph of FIG. 3 represent the average weight of a set of calibration objects as measured. As can be seen, in this example, the coverage amount of detailing agent is inversely proportional to the average weight of the calibration object generated using that amount of detailing agent. Therefore, if a greater coverage amount of detailing agent is used when generating an object, the weight of the object will tend to be lower. The coverage amount of print agent may be described in terms of a contone level, which may vary on an arbitrary scale between a minimum and a maximum coverage amount. In this example, the horizontal axis represents the contone level. For example, the minimum coverage amount of print agent—which is zero—has a contone level of 0, whereas the maximum coverage amount deliverable by a given apparatus may have a contone level of 255. Contone levels in between may be specified, and the additive manufacturing apparatus may be controlled to deliver print agent according to the contone level, for example by varying the number of drops per unit area and/or the drop size.

Figure 4A:
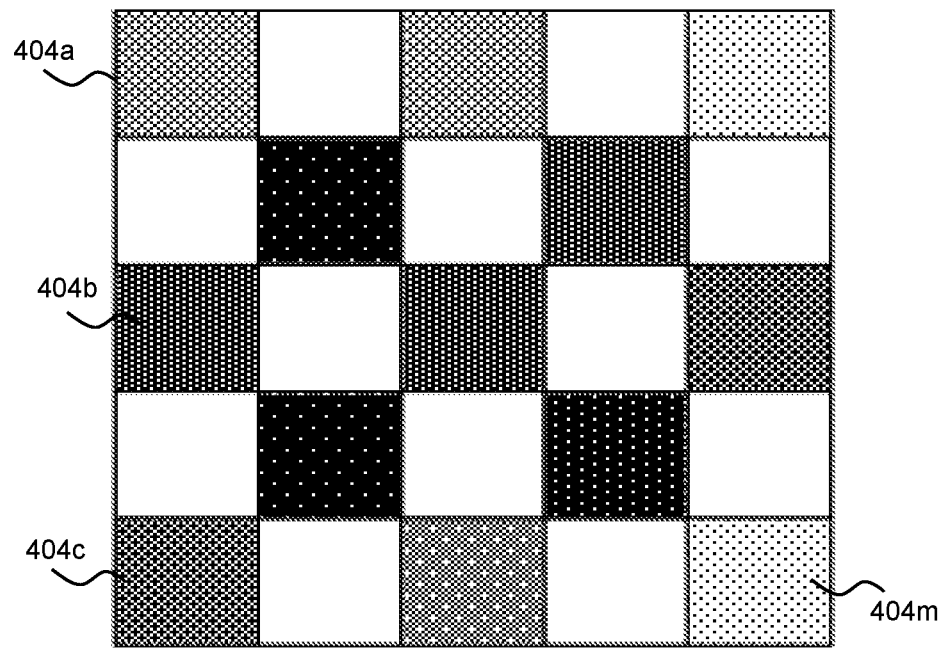
FIGS. 4A, 4C and 4D represent measurements of the objects of FIG. 2A.

FIG. 4A represents individual measurements of objects, such as those depicted in FIG. 2A, associated with their position within a fabrication chamber. Each shaded box 404a-m represents an object, for example box 404a corresponds to object 204a, box 404b corresponds to object 204b, and so on. Lighter shading indicates lower measured weights and darker shading indicates higher weights. Therefore, it can be seen that a first object 204a represented by the first box 404a has a lower weight than a second object 204b represented by a second box 404b. Generally, objects near the edges of the fabrication chamber are shaded lighter, and therefore represent objects having lower weights, whereas boxes near the centre of the fabrication chamber have darker shading and therefore represent objects having greater weights. This may be because the edges of the fabrication chamber tend to be somewhat cooler and, unless calibration is undertaken, the extent of fusion undergone by the objects in this region may be less than the fusion undergone by objects in the centre of the fabrication chamber. In this example, the heaviest object was measured to weigh 13.2 g and the lightest object to weigh 11.1 g, with an average object weighing 12.2 g.

Figure 4B:
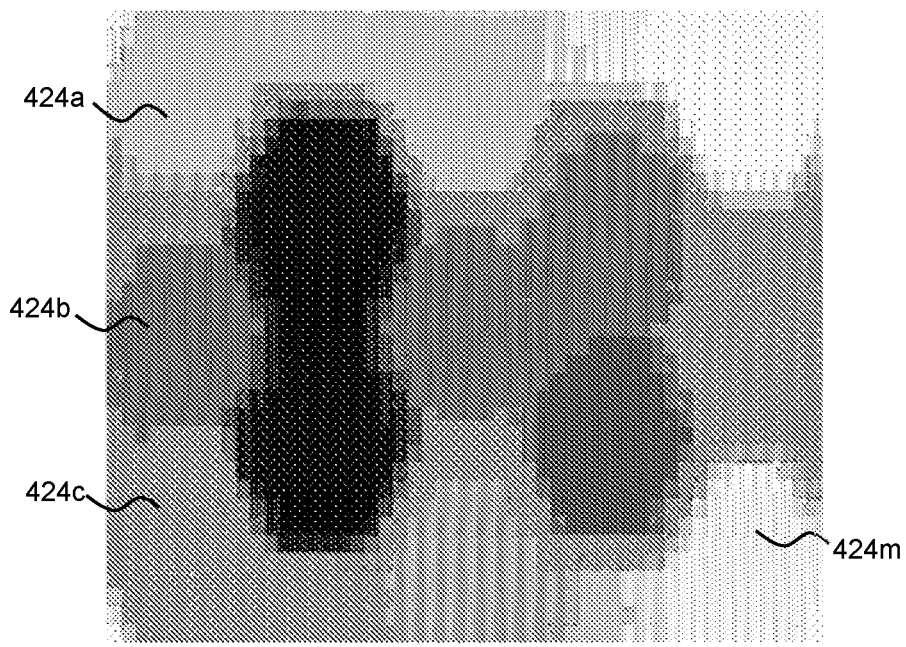
FIG. 4B shows a map of modified print agent coverage amounts.

FIG. 4B shows a map of modified print agent coverage amounts. The map may, in some examples, be referred to as a mask. In this example, the map corresponds to the dimensions of the print bed such that each location of the map corresponds to a location of the fabrication chamber (in this example over the surface of the print bed, i.e. in the x and y dimensions) and is shaded based on the coverage amount of print agent, in this example detailing agent, to be printed when generating object(s) in each portion of the fabrication chamber. Darker regions of the map represent locations or regions of the fabrication chamber where more detailing agent will be applied (e.g. a higher contone level), and lighter regions represent portions where less detailing agent may be applied.

This map was derived from the measurements shown in FIG. 4A, and it can be seen that darker regions of the map correspond to higher weight measurements in FIG. 4A. For example, the coverage amount of fusing agent defined in a first region of the map 424a is based on the weight measurement of the second object 404a in the corresponding position of the fabrication chamber, and the coverage amount of fusing agent defined in a second region of the map 424b is based on the weight measurement of a second object 404b in the corresponding position of the fabrication chamber.

Each of the measurements shown in FIG. 4A are based on a measurement of a single object, and is associated with an object generation position of that object. To obtain the map shown in FIG. 4B, a smoothing function was applied to the measurements of FIG. 4A. In this example, each weight is associated with a region or 'tile'—in this example a hexagon tile—on the print bed and the smoothing function results in a graduation at the edges of the hexagons. In this example the smoothing function is a linear interpolation. However, in other examples, other types of smoothing functions may be applied when determining the map, for example additional smoothing may be achieved by applying a gaussian kernel, for example with sigma of 10 mm. In other examples the interpolation method may be bivariate, spline or cubic, for example. In other examples, the region associated with each measured property may be different, for example corresponding to a point location at the centre of the object as generated.

A map, such as the map shown in FIG. 4B can be determined to define a calibrated, modified, or 'corrected', coverage amount of a print agent to be used at each addressable location of a fabrication chamber to which that agent is to be applied based on the measured physical property of generated object(s). In general, objects which are to be generated at positions associated with heavier calibration objects may be generated using more detailing agent, and/or less fusing agent, than objects which are to be generated at positions associated with lighter calibration objects.

In practice, the map may define a coverage amount of detailing or fusing agent that is to be used at each addressable location (which may be referred to as a voxel, or a pixel within a layer) within the fabrication chamber to which that print agent is to be applied, and may itself define amounts for pixel locations. The amounts may in some examples be offsets from a nominal amount associated with that location, or a global nominal (or baseline) value. For example, a detailing agent may be applied in a band around the perimeter of a layer of an object being formed. Once the locations to which print agent is to be applied are identified, the map can be used to 'look up' a print agent coverage amount associated with each identified print addressable location. Therefore the map may be represented as a look-up table of locations on the print bed associated with a print agent correction (for example, a correction from a baseline coverage amount), or a print agent coverage amount. In another example, a binary mask may be generated which corresponds to the location(s) to which the print agent is to be applied, and this may be combined with the map to determine the coverage amount of print agent to be applied at each location (for example such that values embodied within the map are zero or null apart from where the binary mask indicates that the agent is to be applied). In some examples, the map may define an average or target amount for a region of the layer, and, if that print agent is to be applied to the region, then a halftoning process or the like may be used to determine where to place the agent to provide the target amount in that region.

In some examples, the calibrated print agent coverage amounts may correspond to an array of 'nodes' associated with locations over the print bed (e.g. associated with a centre of mass of a calibration object when generated), and when an object is to be generated, the print agent coverage amount associated with that object may be determined by determining the location at which the object is to be generated, and performing a look-up operation based on print agent coverage amount values associated with at least one node. If the location does not correspond to a node location, then a correction coverage amount and/or a print agent coverage amount may be determined by interpolation, or by extrapolation of the print agent coverage amount values associated with a plurality of nodes, for example weighted by the distance from the nodes, or the value of the closest node may be selected, or the like.

In summary, when the map has been determined, new objects may be generated by the additive manufacturing apparatus using the modified print agent coverage amounts defined in the map, or coverage amounts of print agent based thereon. In some examples there may be further modification of these amounts. For example, as mentioned above, thermal modelling may be carried out for a given or particular build operation and any temperatures which are anticipated to depart from intended temperatures may be identified. For example, large objects and/or closely spaced objects may be associated with potential 'hotspots' and fusing agent amount may be decreased and/or detailing agent amounts may be increased in the region of such hotspots. However, in the examples herein, such adjustments may be made based on the modified, or calibrated, print agent coverage amounts.

Figure 4C:
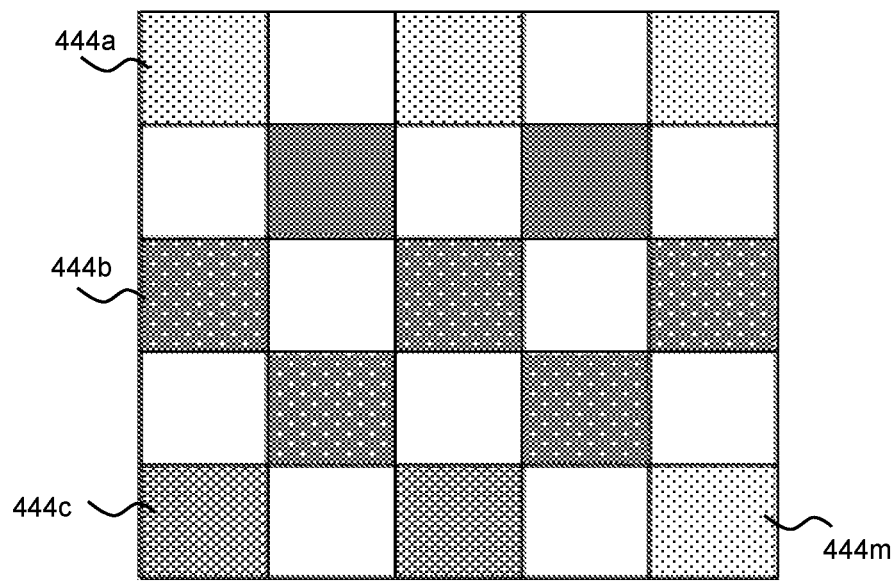

FIG. 4C represents the measured weights of instances of the calibration objects of FIG. 2A generated using the modified detailing agent coverage amounts defined by the map of FIG. 4B, indicating their position on the print bed. As can be seen in comparison with the measured weights of FIG. 4A, there is significantly less variation in the weights of the calibration objects when the calibration objects are generated using the modified detailing agent amounts. In this example the minimum calibration object weight is 11.1 g the heaviest object weight is 12.0 g, with an average object weight of 11.7 g. By selectively increasing the detailing agent used in various regions, the range of weights has decreased from 1.7 g to 0.9 g. Therefore, modifying the detailing agent coverage amounts has significantly reduced variability of the physical properties of the objects.

However, increasing the detailing agent used has resulted in a decrease in the average weight from 12.2 g to 11.7 g. Therefore, it is possible that, by increasing the detailing agent coverage amount, the average weight may be moved further from the intended weight of the objects. It may be possible to compensate for this reduction in weight by increasing the coverage amount of fusing agent which is used. For example, the coverage amount of fusing agent may be increased by an equal offset in each region, thereby increasing the weight of the objects by a fixed coverage amount due to a linear relationship between the object weight and coverage amount of fusing agent.

Figure 4D:
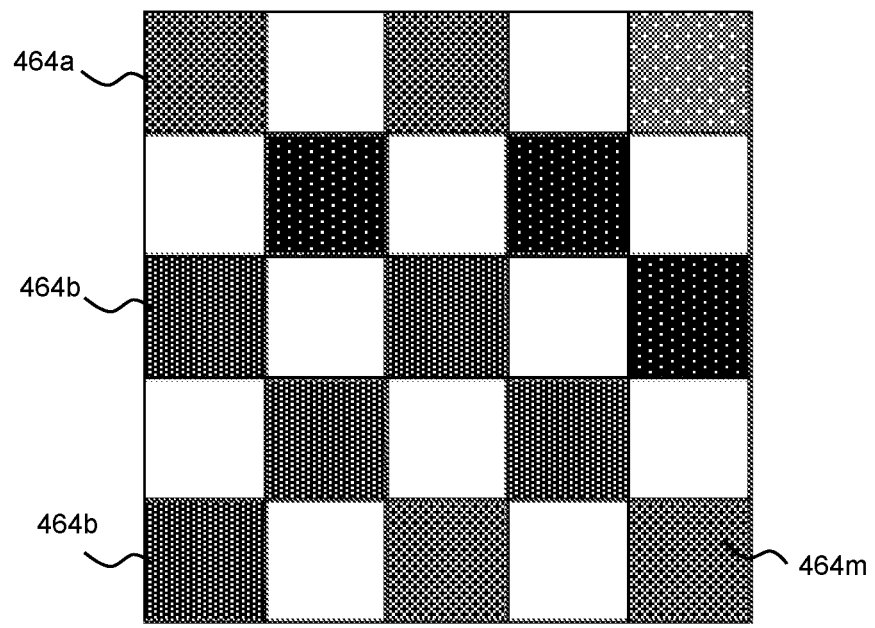

FIG. 4D represents weight measurements of a further set of objects, such as those depicted in FIG. 2A, after increasing the coverage amount of fusing agent uniformly throughout the fabrication chamber to increase the average object weight. It can be seen that the variation in object weights remains relatively small, but the weights have overall increased. In this example the minimum weight is 11.9 g and the maximum weight is 12.8 g, with an average weight of 12.44 g. Therefore, the objects represented by the measurements shown in FIG. 4D maintain the low variability of the objects represented by FIG. 4C, but have an increased average weight to better target the intended weight.

It will be appreciated that, while in the example of FIG. 4A-D, detailing agent coverage amounts were varied using the map, and, as this resulted in the average weight departing from an intended weight, a further correction was carried out using fusing agent. However, this could be reversed: the map in FIG. 4B could instead be derived to have the general effect of decreasing a coverage amount of fusing agent in regions in which heavier objects were generated relative to regions in which lighter objects were generated so as to reduce variability in weight, and then (if a departure from the intended weight is seen) detailing agent may be used to target an intended weight. In other examples, maps for both fusing and detailing agent, or any other agent, may be developed, bearing in mind the combined effect these may have on object weight.

Figure 5:
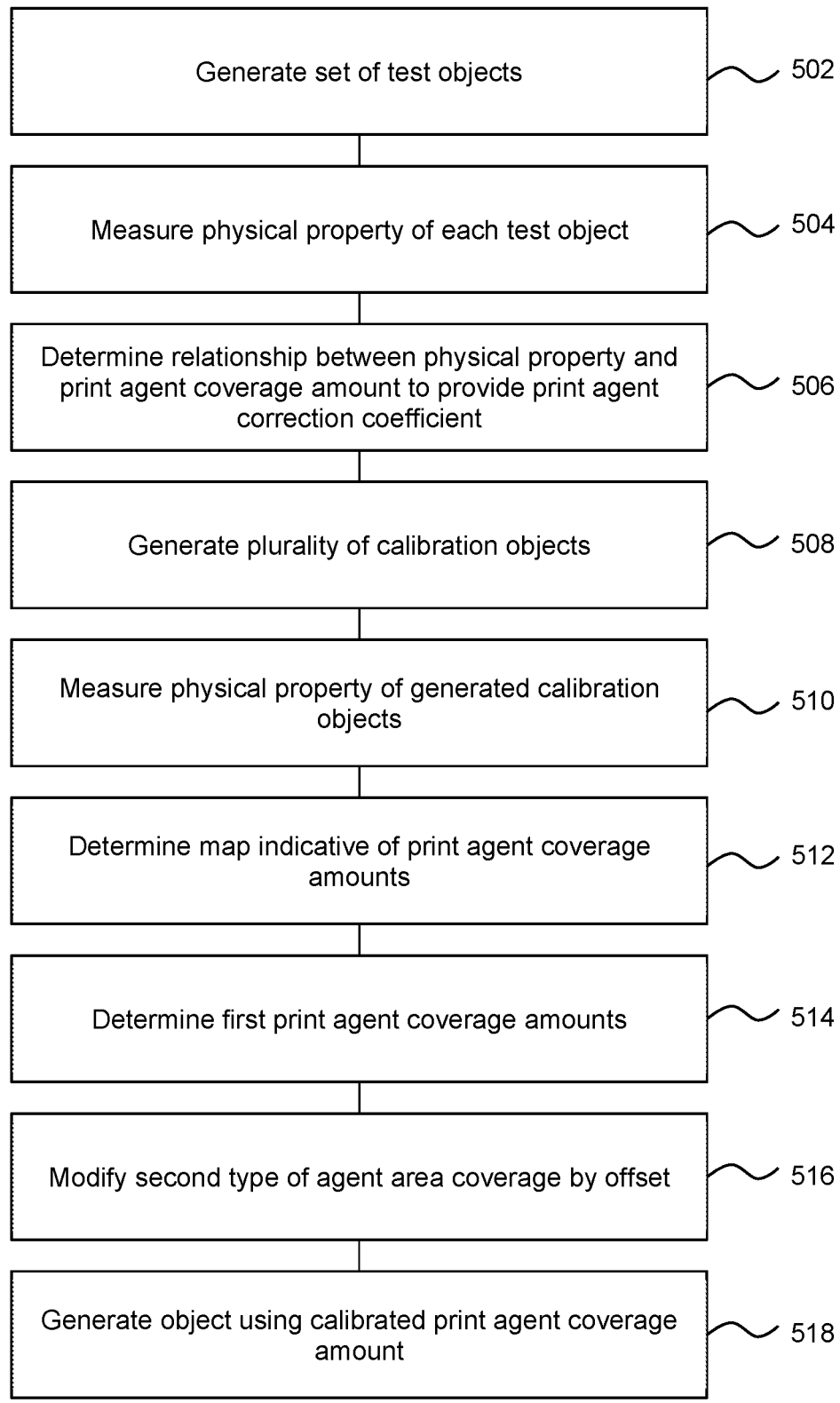
FIG. 5 is another example method of determining print agent coverage amounts for use in additive manufacturing.

FIG. 5 provides an example of the method of FIG. 1. As discussed in greater detail below, blocks 508 to 514 may provide an example of the method of blocks 102 to 106 described in relation to FIG. 1.

Blocks 502 to 508 provide an example method of determining correction coefficients, which may for example provide the modification to a print agent coverage amount to be applied at a particular location and/or corresponding to a particular measured object property. In particular, while in some examples, a modification to a print agent coverage amount may be determined based on a difference between a measured physical property of a calibration object and a nominal, or target, object property, in this example the modification is determined based on this difference and, in addition, a correction coefficient relating to the measured physical property. This allows the sensitivity of a particular physical property value to a change in print agent coverage amount to be taken into account when modifying print agent coverage amount.

Block 502 comprises generating a set of test objects comprising a plurality of instances of a test object, wherein each instance is (i) based on the same object model data, (ii) is generated in a same position in the fabrication chamber, and (iii) is generated using a different coverage amount of print agent. In examples herein, one of the print agent coverage amounts comprises a baseline print agent coverage amount.

In some examples, the test objects may be similar, or substantially identical to, the calibration objects described in relation to FIGS. 2A to 2C. In other examples the test objects and the calibration objects may be different, for example the calibration objects may be representative of the type of object intended to be generated using the additive manufacturing apparatus. For example, the calibration object may comprise a dimension or shape similar to the type of object intended to be generated. In examples herein, the purpose of the calibration objects described in relation to FIGS. 2A to 2C is to characterise the properties of a particular additive manufacturing apparatus, or a particular type of additive manufacturing apparatus, in order to modify the print agent coverage amount(s) for that apparatus or type of apparatus. However, the test objects may be generated to characterise the general relationship between physical properties and print agent coverage amounts, so that when the calibration objects are generated and measured, it can be determined how much the print agent coverage amounts are to be varied in order to achieve intended object properties. Therefore, in some examples test objects may be referred to as characterisation objects.

While a single object may be generated in each of a plurality of build operations to generate a batch of objects, in some examples several objects may be generated in a different position of each build operation, for example as shown in FIGS. 2A to 2C. In some examples herein generating the set of test objects comprises generating a plurality of sets of test objects, wherein each set of test objects is generated in a different position in the fabrication chamber, and each set is generated over a plurality of build operations. Several build operations may be performed to generate the plurality of instances of the test objects, wherein for each build operation a different coverage amount of print agent is used.

For example, a first build operation may comprise generating 14 test objects having a predetermined arrangement using a detailing agent contone level of 2, a second build operation may comprise generating 14 test objects having the same arrangement as the first build operation and comprising nominally the same, or similar objects to those generated in the first build operation using a detailing contone level of 11 and a third build operation may comprise generating 14 test objects, again having the same arrangement and being similar, or nominally the same as the objects generated in the first and second build operations, but this time using a detailing agent contone level of 20. Within each build operation, each test object may be generated using the same print agent coverage amount, but the print agent coverage amount differs between build operations. This example therefore provides 14 sets of test objects, each set comprising three test objects, wherein the test objects of a set are each generated in a same location and in different build operations.

Block 504 comprises measuring the physical property of each test object. The physical property may for example be a strength, flexibility, dimension or weight. Measuring the weight of an object may be a convenient measurement to perform as it provides an indication of the extent of fusing which has occurred and may be related to other physical properties. Furthermore, measuring the weight of an object may be simpler to perform than measuring another property, such as strength or flexibility.

Block 506 comprises determining a relationship between the physical property and print agent coverage amount based on the measured physical properties of a set of test objects, wherein the determined relationship provides a print agent correction coefficient associated with the physical properties of the test object generated using the baseline coverage amount of print agent. For each set of test objects the relationship between the physical property and print agent coverage amount may be determined. For example, the print agent coverage amount may be plotted against measured weight for a set of test objects in a particular position. For example, the weight of three objects generated in the position of the first object 204a of FIG. 2A may be measured, wherein three objects are generated using, respectively, detailing agent contone levels of 2, 11 and 20, and the measured weight may be plotted against contone level to obtain the relationship between object weight and detailing contone level for the set of objects in this position. Similarly, the relationship may be determined for each other object position 204-$m$. Therefore, several measurements of the gradient of print agent coverage versus weight may be obtained relating the detailing agent to the object weight. In other examples, rather than determining the relationship for each position, the relationship may for example be determined for the entire fabrication chamber by using measurements of all the generated objects or an average weight, or the like.

The print agent correction coefficient may describe how a physical property, such as the weight of an object, varies with the coverage amount of print agent for a given physical property. For example, lighter objects may be more impacted by a predetermined change in print agent coverage amount than heavier objects, in particular objects which have relatively thin strut-like structures which may be affected more by changes in print agent. As the objects in a set are generated in the same location, they are likely to be subject to the same thermal conditions, and therefore the conditions of fusing (other than due to the different print agent coverage amounts) are likely to be the same.

Therefore, the print agent correction coefficient may be used to modify the coverage amount of print agent used in order to modify a physical property of an object to be generated by varying the coverage amount of print agent which is deposited when generating the object, wherein the variation applied depends on the weight of the calibration object, based on a relationship between weight and the effect of varying print agent coverage amount determined using the test objects. For example, the coverage amount of print agent may be varied in order to provide a generated object with a target weight.

Blocks 508 to 516 may be an example of determining print agent coverage amounts for each region, for example by obtaining a map defining print agent coverage amounts for different regions within a fabrication chamber. In some examples, this may be carried out separately to block 502 to 506, for example using a different apparatus. and may therefore comprise a separate method. In some examples, the print agent correction coefficients may be predetermined and obtained from a memory or the like.

Block 508 comprises generating a plurality of calibration objects, each in a different region of a fabrication chamber of an additive manufacturing apparatus, for example as described in relation to block 102 of FIG. 1. In some examples the additive manufacturing apparatus used to generate the calibration objects is a different additive manufacturing apparatus than that used to generate the test objects. This may be because the test objects are generated in order to characterise the relationship between the physical property and print agent coverage amount, whereas the calibration objects are used to obtain a print agent coverage amount to use in a specific additive manufacturing apparatus (or type of apparatus) i.e. in order to calibrate an apparatus.

Block 510 comprises measuring a physical property of each generated calibration object. The physical property may be the same physical property measured in block 504. For example, the physical property may be a strength, flexibility, dimension or weight.

Block 512 comprises determining, from a relationship between each measured object property and a print agent correction coefficient, and a difference between each measured object property and a nominal object property, a map indicative of print agent coverage amounts. The print agent coverage amounts may for example comprise a correction or offset from a baseline coverage amount, or a print agent coverage amount. The nominal property may for example be a measured property of one of the calibration objects. For example, the nominal property may comprise a weight, which may be a predetermined weight, or may be a selected measured weight of the calibration objects.

In a particular example, where the objects are generated using a relatively low level of detailing agent, increasing the detailing agent may tend to decrease the weight of the objects. Thus, the weight of the lightest object may be selected as a nominal, or target, weight, (as in this example, the baseline amount of detailing agent is relatively low, such that it can be increased, but not appreciably decreased) and the values for generating the map may be determined based on the difference in weight between a given object and the nominal weight, as well as the print agent correction coefficient associated with the measured weight. Thus, there may be no correction associated with a region of generation of an object of nominal weight.

However, in other examples (in particular where adjustment of a print agent may be made in either direction), a different nominal property may be selected, such as an average weight, or a predetermined target weight.

The determined map may be a map as described in relation to FIG. 4B, which specifies a print agent coverage amount to use at each location within the fabrication chamber.

In some examples, the map is obtained by interpolating between the print agent coverage amounts or measured properties to obtain the map indicative of calibrated print agent coverage amounts. For example, the calibrated print agent coverage amounts may be determined for each location associated with a calibration object, then the print agent coverage amounts for other locations determined by interpolating between these locations. In other examples, an interpolation may be performed on the measurements prior to determining the print agent coverage amounts, then the determined print agent coverage amounts may be determined based on the interpolated measurements of the physical property. As noted above, in some examples, the map may be embodied as a table or array of values representing the values of print agent coverage amounts to be used in each print addressable location at which that print agent is to be applied. In some examples, the table may comprise a look-up table. In some such examples, the table/array may be determined using the weight of the calibration objects and the correction coefficients generated based on test objects, wherein the weight of the object may be related to a correction coefficient based on a look-up table.

Block 514 comprises determining calibrated print agent coverage amounts for each region based on the measured physical property of the calibration object generated in that region wherein the determined print agent coverage amounts are to be used as or to determine print agent coverage amounts in a subsequent object generation operation. Block 514 may correspond to block 106 of FIG. 1.

In some examples the print agent is a first type of agent. Block 516 comprises modifying a second type of agent area coverage for each region by an offset. The second type of agent may be varied by a fixed amount in each position of the fabrication chamber, for example to target an intended object property such as weight. In some examples the first type of agent is a detailing agent and the second agent type is a fusing agent, although this designation of the first and second agent may be reversed. The amount of first type of agent may be defined by the map to reduce variability in object properties throughout the fabrication chamber and the amount of the second type of agent may be varied by a fixed amount in each position, to target a specific intended property, such as weight, as described in relation to FIGS. 4A to 4D.

In this example, the baseline coverage amount of detailing agent is a contone level of 2. Therefore, the coverage amount of detailing agent cannot be significantly reduced. Therefore, in this example the method reduces the variability in properties of generated objects by selectively increasing the coverage amount of detailing agent and then targets an intended weight by increasing the coverage amount of fusing agent. However, in other examples the coverage amount of fusing agent and/or detailing agent may be selectively varied to reduce variability. For example, a map defining the coverage amount of fusing agent at each position within the fabrication chamber may be determined in an analogous manner to the method described for obtaining a map defining detailing agent coverage amounts and, if generated objects do not (or are predicted not to) result in an intended physical property, the coverage amount of detailing agent may be increased by a fixed coverage amount throughout the fabrication chamber to target a specific or nominal physical property.

Block 518 comprises generating an object in additive manufacturing using the calibrated print agent coverage amount(s) for the region in which the object is generated.

Figure 6:
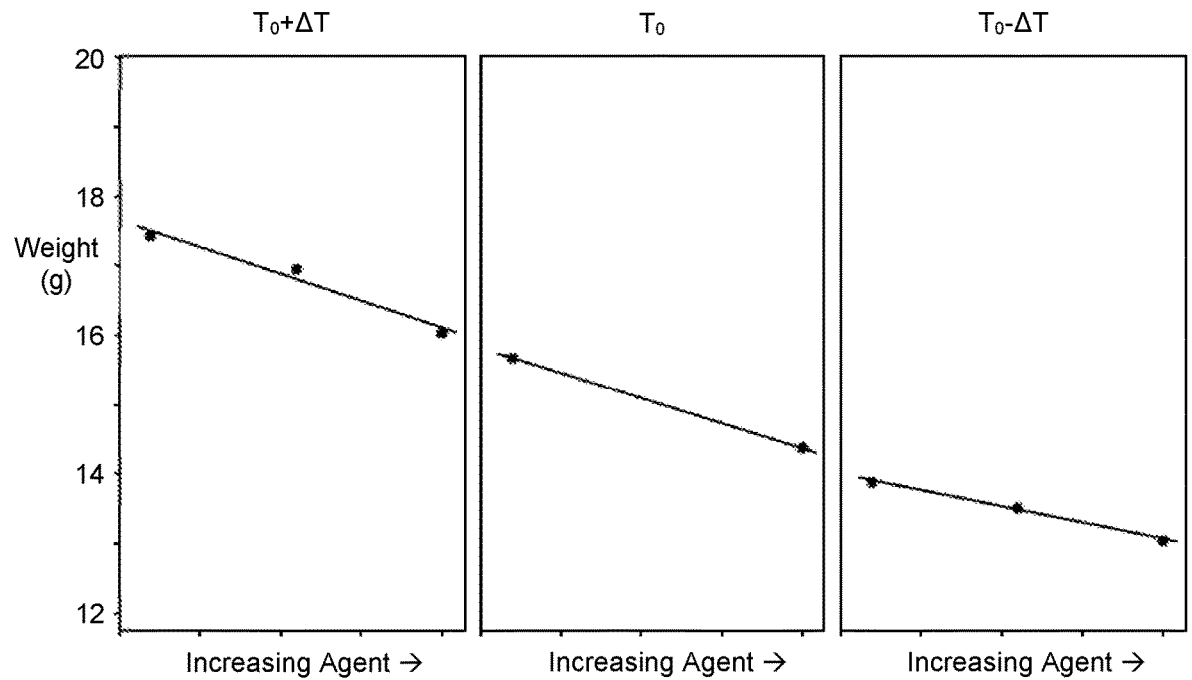
FIG. 6 is a graph showing the relationship between temperature and corelation between weight and print agent coverage amount.

FIG. 6 shows three graphs demonstrating the relationship between temperature and correlation between object weight and print agent coverage amount. Each graph is a plot of weight against detailing agent coverage amount, based on measurements of objects, such as those described in relation to FIGS. 2A to 2C. As can be seen, the object weight decreases with increasing detailing agent coverage amount (wherein the detailing coverage amount range on the horizontal axis is the same for all three graphs). The central graph shows the relationship at a default target fusing temperature of $T_0=105°$ C. The left graph shows the relationship at a temperature $T_0+\Delta T$ and the right graph shows the relationship at a temperature $T_0-\Delta T$, wherein $\Delta T$ is a small temperature difference. The gradient of the fitted trendline in the left graph is steeper than the gradient of the fitted trendline of the central graph which is in turn steeper than the gradient of the fitted trendline in the right graph. These graphs demonstrate that the magnitude of the gradient decreases with decreasing temperature. This suggests that the gradient of weight versus print agent coverage amount may be predictable, if the fusing temperature is known. In some examples, the weight of an object is related to the fusing temperature, therefore the measurement of weight may also provide an indication of the temperature, and therefore may allow prediction of the gradient of the weight versus fusing agent coverage amount, allowing determination of the fusing agent coverage amounts to use without generating sets of objects using multiple different coverage amounts of print agent. Thus, this serves to illustrate why, in some examples, the modification of print agent coverage amount applied in a hotter region of the fabrication chamber may be different to the modification of print agent coverage amount applied in a cooler region of the fabrication chamber.

Figure 7:
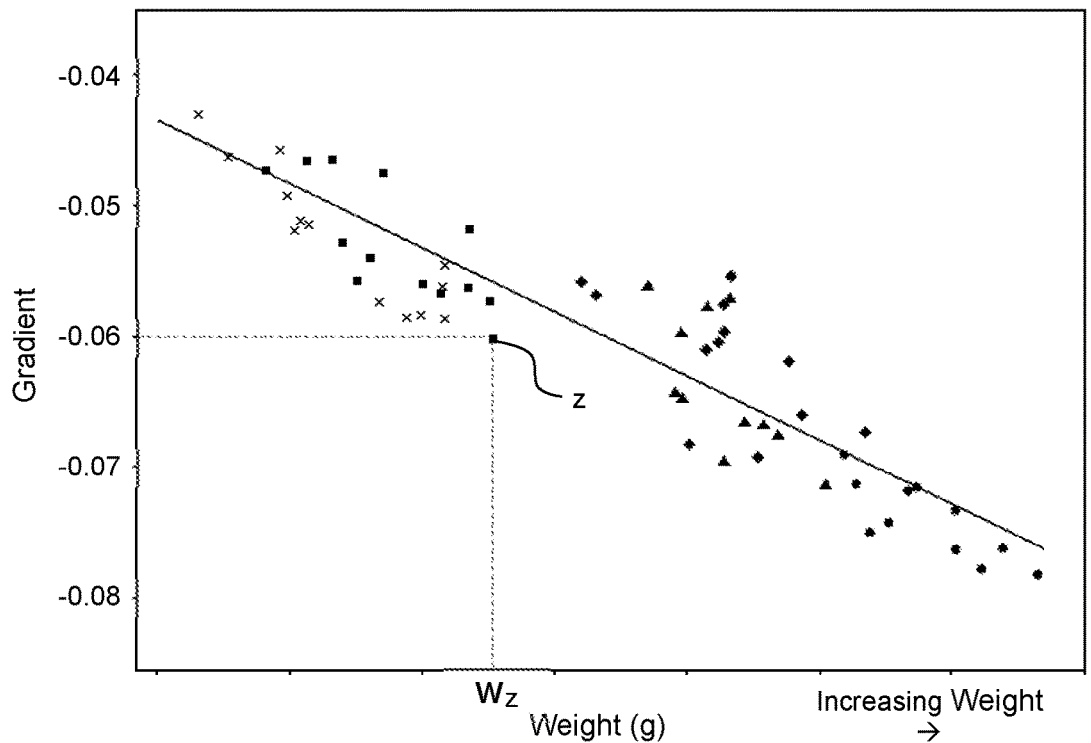
FIG. 7 is a graph showing the relationship between weight of an object generated using a baseline print agent coverage amount and corelation between weight and print agent coverage amount.

FIG. 7 is a graph showing the relationship between measured weights of objects generated in additive manufacturing using a baseline coverage amount of detailing agent, in this example at a contone level of 2, and the gradient of the plot of object weight against print agent coverage amount for a particular object position in a fabrication chamber. The data was obtained by generating multiple sets of test objects, such as those described in relation to FIGS. 2A to 2C and block 502, at different detailing agent coverage amounts and using different additive manufacturing apparatus. Each point of the graph represents a set of test objects (i.e. objects generated at a given position within a fabrication chamber over a number of different build operations, using different print agent coverage amounts in the different build operations). The horizontal axis is the weight of an object of the set which was generated using a baseline coverage amount of detailing agent, in this example a contone level of 2, and the vertical axis is the gradient of the plot of weight against detailing agent coverage amount for objects of that set. For example, one point of the graph may be obtained from the central graph of FIG. 6 by reading the weight of the object generated at the baseline contone level and determining the gradient of the line.

An example point 'z' corresponds to an object generated using a baseline coverage amount of print agent and has a weight of $w_z$. Further objects were generated in the same position using different coverage amounts of print agent and a graph plotted of weight against print agent (similar to that of FIG. 6). The gradient of this plot was determined to be −0.06, therefore the point 'z' is plotted with coordinates ($w_z$, −0.06).

The shape of the points in the graph represents the additive manufacturing apparatus from which the data point was obtained, i.e. all points of the same shape were obtained from the same additive manufacturing apparatus, but from different sets of test objects, each generated at a different location, within the fabrication chamber.

This graph shows that as the weight of objects printed with the baseline coverage amount of print agent increases, the associated print agent correction coefficient tends to decrease. Therefore, this relationship can be used to estimate the print agent correction coefficient, and therefore to provide an estimate of the detailing agent coverage amount which is to be used for a region of the fabrication chamber in order to provide reduced variability of weight of objects based on a measured weight of a calibration object.

For example, a calibration object may be generated in a first position within a fabrication chamber using a baseline detailing agent coverage amount with a contone level of 2. If the generated calibration object has a weight of 15.5 g, then the gradient of the weight versus detailing agent coverage amount can be determined from FIG. 7 to be −0.07. Therefore, in order to target a particular weight, the coverage amount of detailing agent can be varied based on this gradient. The relationship may be extrapolated to objects having a measured weight outside the plotted weights.

In some examples the detailing agent coverage amount can be calculated according to the equation $DA_i=DA_{BL}+(\min(w)-w_i)/g_i$, wherein $DA_i$ is the coverage amount of detailing agent to be used in region i of the fabrication chamber, $DA_{BL}$ is the baseline detailing agent coverage amount, $w_i$ is the measured weight of a calibration object generated in the region i, $\min(w)$ is the minimum weight of all the generated calibration objects (in this case, the nominal target weight) and $g_i$ is the gradient determined based on the weight $w_i$. For example, the gradient $g_i$ can be determined from the graph of FIG. 7, by looking up the weight $w_i$ on the horizontal axis, and reading the corresponding gradient from the vertical axis based on the trend line. In this example the baseline detailing agent coverage amount $DA_{BL}$ is 2, therefore the equation may be written as $DA_i=2+(\min(w)-w_i)/g_i$. In this example, the print agent correction coefficient is the gradient which is determined based on the measured calibration object weight, for example from FIG. 7.

Therefore, provided the relationship between object weight and print agent correction coefficient has been predetermined, in order to obtain the detailing agent coverage amounts to use at each region of the fabrication chamber, the calibration objects are generated using the baseline detailing agent coverage amount, and without generating calibration objects at a range of different detailing agent coverage amounts. This may improve determination of the calibrated print agent amounts, such as the detailing agent coverage amounts to use to reduce variability within the fabrication chamber. In addition, an individual fabrication chamber may be more effectively characterised using a single build process based on this relationship. Furthermore, the build process may use calibration objects with a low height (i.e. a small z-dimension) which further reduces the time taken to generate the calibration objects.

In examples where a different print agent coverage amount is varied, such as fusing agent, an analogous equation may be used for that agent instead of detailing agent.

Figure 8:
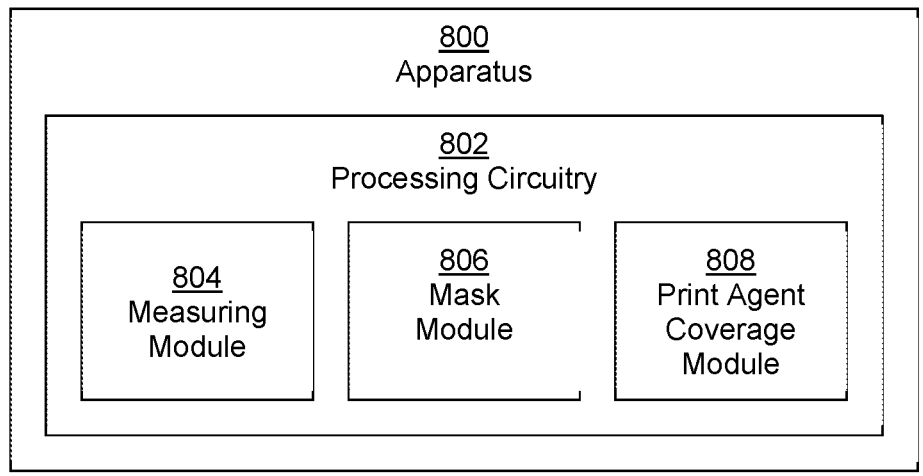
FIG. 8 is an example of an apparatus.

FIG. 8 is an example apparatus 800, which may be used in some additive manufacturing operations, for example in determining coverage of a print agent to use when generating objects. The apparatus 800 comprises processing circuitry 802, the processing circuitry 802 comprising a measuring module 804, mask module 806 and a print agent coverage module 808. In some examples, the processing circuitry 802 may carry out block 104 and/or block 106 of FIG. 1, or any or any combination of blocks 512 to 516 of FIG. 5.

In this example, in use of the apparatus 800, the measuring module 804 is to obtain measurements of physical properties of calibration objects generated at a plurality of regions of a fabrication chamber of an additive manufacturing apparatus. The measuring module 804 may obtain measurements measured by an external apparatus, and/or it may comprise apparatus to perform the measurements, such as weighing scales to measure a weight.

In this example, in use of the apparatus 800, the mask module 806 obtains a mask defining print agent area coverages for a plurality of locations or regions of a fabrication chamber of an additive manufacturing apparatus, wherein the mask is based on the obtained measured physical properties of calibration objects generated at the plurality of regions. For example, the mask may be determined based on measured calibration object weights. For example, the mask may be determined such that the calibration objects, if re-generated, would be more likely to have similar properties (e.g. similar weights), or would theoretically have at least nominally the same measured property as one another. In some examples, a measured property of one of the calibration objects may be selected as the target, or nominal property. The mask may be a map, such as the map shown in FIG. 4B (and the mask module 806 may therefore be termed the map module in some examples), and/or may be embodied as an array or table of values which defines the print agent area coverage for each location (e.g. each print addressable location, or a set of print addressable locations) of a fabrication chamber based on a measured property of a calibration object. The mask may be determined as described in relation to block 106 of FIG. 1 or blocks 508 to 512 of FIG. 5, and may in some examples be generated based on print agent correction coefficients as described in relation to block 506 and FIGS. 6 and 7. For example, the mask module 806 may carry out block 512 of FIG. 5.

In this example, in use of the apparatus 800, the print agent coverage module 808 determines, for an object to be generated in additive manufacturing, a coverage of print agent to be used when generating an object in additive manufacturing based on the mask and the intended object generation position of the object within the fabrication chamber. For example, the print agent coverage module 808 may carry out any of the methods described in relation to block 514 and/or block 516 of FIG. 5, or may combine the mask with a binary mask indicative of the region(s) to which the print agent is to be applied as described in relation to FIG. 4B. The mask may comprise values of print agent coverage to be used, for example as a contone level or percentage area coverage. In other examples the mask may define the print agent coverage in arbitrary units or as a relative amount relative to a baseline coverage amount of print agent. For example, the mask may define the print agent coverage amounts as an absolute increase or decrease, or as a proportional increase or decrease in print agent coverage amount relative to an initial print agent coverage amount.

Figure 9:
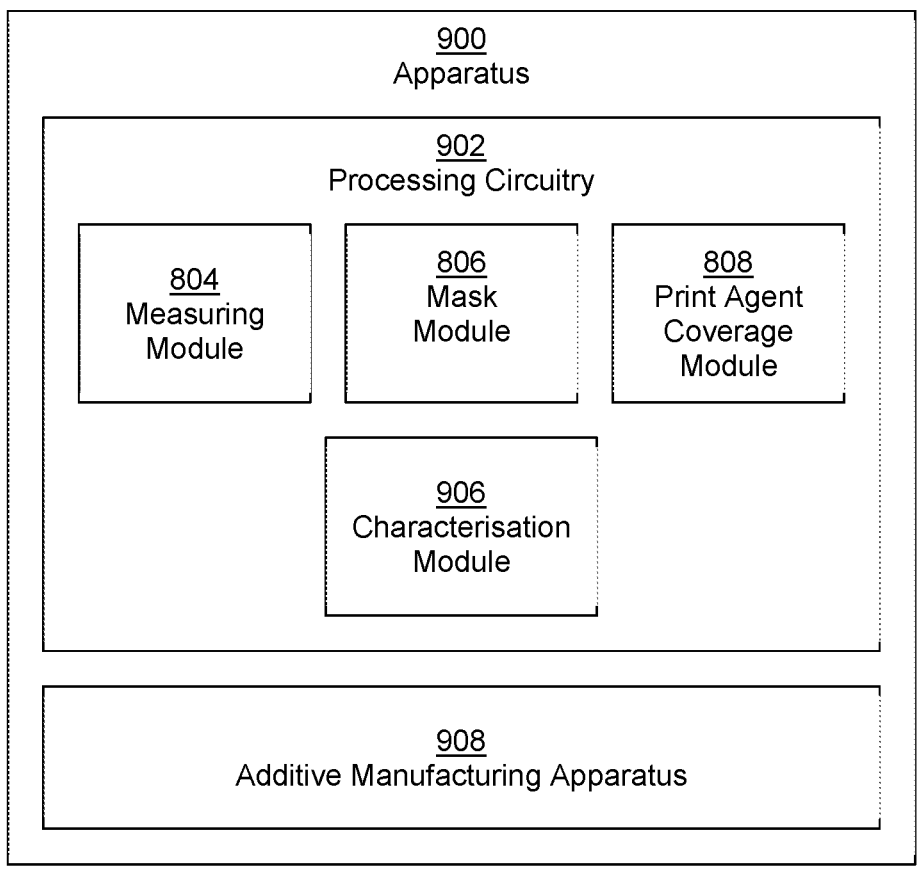
FIG. 9 is another example of an apparatus.

FIG. 9 shows an example of an apparatus 900 comprising processing circuitry 902 which includes the measuring module 804, the mask module 806 and the print agent coverage module 808 of the apparatus of FIG. 8. In addition, the processing circuitry 902 also comprises a characterisation module 906, and the apparatus 900 further comprises additive manufacturing apparatus 908.

In this example, in use of the apparatus 900, the characterisation module 906 obtains measured physical properties of a set of test objects generated at the plurality of regions and using a range of different print agent coverages. The set of test objects may be a set of objects as described in relation to FIGS. 2A to 2C, for example by the additive manufacturing apparatus 908. Generating the set of test objects may comprise performing several build operations, wherein each build operation comprises generating test objects using a different amount of print agent. In some examples, the physical property obtained by the measuring module 804 and obtained by the characterisation module 906 is a weight of an object.

In this example, in use of the apparatus 900, the mask module 806 determines the mask based on the obtained physical properties of the set of test objects as well as the obtained physical properties of the calibration objects. The print agent coverages defined by the mask may be determined as described in relation to FIG. 1, FIG. 5 or FIG. 7. In particular, while in some examples, the mask may be generated based on a difference between the target, or nominal, property and the measured property, in this example, the mask may be generated based on (i) a difference between the nominal property and the measured property, and (ii) based on a print agent correction coefficient which may be related to the measured property.

In addition, in this example the apparatus further comprises additive manufacturing apparatus 908 which may, in use of the apparatus 900, generate at least one object using a print agent coverage comprising, or based on, the determined print agent coverage. In addition, the additive manufacturing apparatus 908 may generate at least one test object and/or at least one calibration object as described above.

The additive manufacturing apparatus 910 may generate objects in a layer-wise manner by selectively solidifying portions of layers of build material. The selective solidification may in some examples be achieved by selectively applying print agents, for example through use of 'inkjet' liquid distribution technologies, and applying energy, for example heat, to each layer using the plurality of fusing energy sources. In some examples, object model data modelling object(s) to be generated may be received and control instructions determined as to where to print agent on a layer of build material in order to generate a layer of the object. In some examples, the regions which comprise build material which is intended to fuse are determined, at least in part, by reference to control data used to instruct the distribution of print agents. Such control data may be generated based on object model data representing at least a portion of an object to be generated by an additive manufacturing apparatus by fusing build material. For example print material coverage amounts may be determined as outlined above, and then the placement of drops of print agents may be determined using halftoning techniques or the like to provide a determined print agent coverage amount. The object model data may for example comprise a Computer Aided Design (CAD) model, and/or may for example be a STereoLithographic (STL) data file.

In use of the apparatus 908, energy may be provided by the plurality of fusing energy sources to cause the build material to which fusing agent has been applied to fuse. The additive manufacturing apparatus 908 may comprise additional components not shown herein, for example a fabrication chamber, at least one print head for distributing print agents, a build material distribution system for providing layers of build material and the like.

The apparatus 900 may, in some examples, carry out at least one of the blocks of FIG. 1 or FIG. 5.

Figure 10:
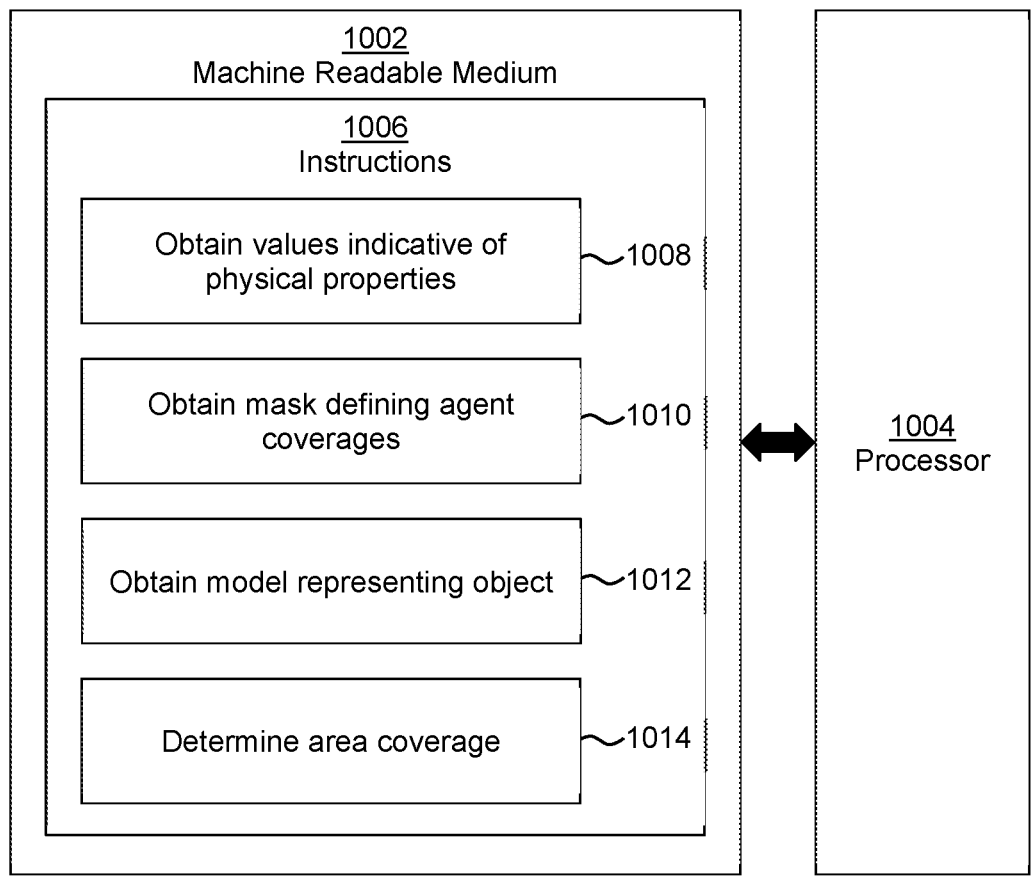
FIG. 10 is an example machine-readable medium associated with a processor.

FIG. 10 shows an example of a tangible machine readable medium 1002 in association with a processor 1004. The machine readable medium 1002 stores instructions 1006 which, when executed by the processor 1004 cause the processor to carry out actions.

In this example, the instructions 1006 comprise instructions 1008 to cause the processor 1004 to obtain values indicative of the physical properties of each of a plurality of calibration objects generated by an additive manufacturing apparatus. The physical properties may comprise a weight, flexibility, strength or dimension, as described in relation to block 104 of FIG. 1, and may be determined by measurement, or retrieved from a memory or over a network or the like.

In this example, the instructions 1006 comprise instructions 1010 to cause the processor 1004 to determine a mask defining agent coverages for each of a plurality of locations or regions within a fabrication chamber, wherein the mask is determined based on the values indicative of the physical properties. The mask may be obtained as described in any of blocks 102 to 106 of FIG. 1 or as set out in relation to the map described in blocks 502 to 512 of FIG. 5.

In this example, the instructions 1006 comprise instructions 1012 to cause the processor 1004 to obtain a model representing an object to be generated in additive manufacturing. The model may define which portions of the build material within the fabrication chamber are intended to be solidified and therefore may define onto which portions of the fabrication chamber print agents are deposited.

In this example, the instructions 1006 comprise instructions 1014 to cause the processor 1004 to determine an area coverage of agent to be used when generating the object based on the intended position of the object within the fabrication chamber and the mask. The mask may define a coverage amount of print agent associated with each location within the fabrication chamber. For example, if a portion of the fabrication chamber is intended to be solidified to form the object, in an example where the mask defines the coverage amount of fusing agent, the corresponding portion of the mask may be looked up to determine the coverage amount of fusing agent to deposit at that location.

In some examples, the machine readable medium 1002 further comprises instructions to generate, using additive manufacturing, the object based on the determined area coverage. An additive manufacturing apparatus may be used, for example as described in relation to FIG. 9 to generate the object.

Examples in the present disclosure can be provided as methods, systems or machine-readable instructions, such as any combination of software, hardware, firmware or the like. Such machine-readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each block in the flow charts and/or block diagrams, as well as combinations of the blocks in the flow charts and/or block diagrams can be realized by machine readable instructions.

The machine-readable instructions may, for example, be executed by a general purpose computer, a special purpose computer, an embedded processor or processors of other programmable data processing devices to realize the functions described in the description and diagrams. In particular, a processor or processing apparatus may execute the machine-readable instructions. Thus, functional modules of the apparatus and devices (such as the measuring module 804, the mask module 806, print agent coverage module 808, and/or the characterisation module 910) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine-readable instructions may also be stored in a computer readable storage that can guide the computer or other programmable data processing devices to operate in a specific mode.

Such machine-readable instructions may also be loaded onto a computer or other programmable data processing devices, so that the computer or other programmable data processing devices perform a series of operations to produce computer-implemented processing, thus the instructions executed on the computer or other programmable devices realize functions specified by block(s) in the flow charts and/or block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
   generating a plurality of calibration objects, each object generated in a different region of a fabrication chamber of an additive manufacturing apparatus;
   receiving, by processing circuitry from a scale, a measurement of a physical property of each calibration object, the physical property comprising the weight of the calibration object;

determining, by processing circuitry, calibrated print agent coverage amounts for each region based on the measured physical property; and
generating an object via additive manufacturing based on the calibrated print agent coverage amounts for the region in which the object is generated.

2. The method of claim 1, wherein determining the calibrated print agent coverage amounts comprises:
determining, from a difference between each measured object property and a nominal object property, a map indicative of print agent coverage amounts.

3. The method of claim 2, wherein the calibrated print agent coverage amounts are determined based on a relationship between each measured object property and a print agent correction coefficient.

4. The method of claim 3, further comprising determining print agent correction coefficients, wherein determining the print agent correction coefficients comprises:
generating a set of test objects comprising a plurality of instances of a test object, wherein each instance is based on the same object model data and is generated using a different coverage amount of print agent, wherein one of the print agent coverage amounts comprises a baseline print coverage agent amount;
measuring the physical property of each test object; and
determining a relationship between the physical property and print agent coverage amount based on the measured physical properties of the set of test objects,
wherein the determined relationship provides the print agent correction coefficient associated with the physical properties of the test object generated using the baseline amount of print agent.

5. The method of claim 4, further comprising determining a plurality of print agent correction coefficients by generating a plurality of sets of test objects,
and wherein each set of test objects is generated in a different position in the fabrication chamber.

6. The method of claim 2, further comprising:
interpolating between the print agent coverage amounts or measured properties to obtain the map indicative of print agent coverage amounts.

7. The method of claim 1, wherein the calibrated print agent coverage amounts are determined print agent coverage amounts of a first agent type and the method further comprises:
modifying a second type of agent area coverage for each region by an offset.

8. A non-transitory machine-readable medium storing instructions executable by a processor to perform processing comprising:
causing an additive manufacturing apparatus to generate a plurality of calibration objects, each object generated in a different region of a fabrication chamber of the additive manufacturing apparatus;
receiving a measurement of a physical property of each calibration object as measured by a scale, the physical property comprising the weight of the calibration object;
determining calibrated print agent coverage amounts for each region based on the measured physical property; and
causing the additive manufacturing apparatus to generate an object via additive manufacturing based on the calibrated print agent coverage amounts for the region in which the object is generated.

9. The non-transitory machine-readable medium of claim 8, wherein determining the calibrated print agent coverage amounts comprises:
determining, from a difference between each measured object property and a nominal object property, a map indicative of print agent coverage amounts.

10. The non-transitory machine-readable medium of claim 9, wherein the calibrated print agent coverage amounts are determined based on a relationship between each measured object property and a print agent correction coefficient.

11. The non-transitory machine-readable medium of claim 10, wherein the processing further comprises determining print agent correction coefficients, and wherein determining the print agent correction coefficients comprises:
generating a set of test objects comprising a plurality of instances of a test object, wherein each instance is based on the same object model data and is generated using a different coverage amount of print agent, wherein one of the print agent coverage amounts comprises a baseline print coverage agent amount;
measuring the physical property of each test object; and
determining a relationship between the physical property and print agent coverage amount based on the measured physical properties of the set of test objects,
wherein the determined relationship provides the print agent correction coefficient associated with the physical properties of the test object generated using the baseline amount of print agent.

12. The non-transitory machine-readable medium of claim 11, wherein the processing further comprises determining a plurality of print agent correction coefficients by generating a plurality of sets of test objects,
and wherein each set of test objects is generated in a different position in the fabrication chamber.

13. The non-transitory machine-readable medium of claim 9, wherein the processing further comprises:
interpolating between the print agent coverage amounts or measured properties to obtain the map indicative of print agent coverage amounts.

14. The non-transitory machine-readable medium of claim 8, wherein the calibrated print agent coverage amounts are determined print agent coverage amounts of a first agent type and the processing further comprises:
modifying a second type of agent area coverage for each region by an offset.

15. A system comprising:
a processor; and
a memory storing instructions executable by the processor to perform processing comprising:
causing an additive manufacturing apparatus to generate a plurality of calibration objects, each object generated in a different region of a fabrication chamber of the additive manufacturing apparatus;
receiving a measurement of a physical property of each calibration object as measured by a scale, the physical property comprising the weight of the calibration object;
determining calibrated print agent coverage amounts for each region based on the measured physical property; and
causing the additive manufacturing apparatus to generate an object via additive manufacturing based on the calibrated print agent coverage amounts for the region in which the object is generated.

16. The system of claim 15, wherein determining the calibrated print agent coverage amounts comprises:

determining, from a difference between each measured object property and a nominal object property, a map indicative of print agent coverage amounts.

17. The system of claim 15, wherein the calibrated print agent coverage amounts are determined print agent coverage amounts of a first agent type and the processing further comprises:
   modifying a second type of agent area coverage for each region by an offset.

18. The system of claim 15, further comprising the additive manufacturing apparatus that includes the processor and the memory.

19. The system of claim 15, further comprising a computing device separate from the additive manufacturing apparatus and that includes the processor and the memory.

* * * * *